United States Patent
Abbey et al.

(10) Patent No.: US 9,894,878 B2
(45) Date of Patent: Feb. 20, 2018

(54) TRAVELING FEEDING APPARATUS

(71) Applicants: Loving Pets Corporation, Cranbury Township, NJ (US); Gravity Product Development, LLC, Golden, CO (US)

(72) Inventors: Eric Abbey, East Brunswick, NJ (US); John James Stone, Golden, CO (US)

(73) Assignees: LOVING PETS CORPORATION, Cranbury Township, NJ (US); GRAVITY PRODUCT DEVELOPMENT, LLC, Golden, CO (US)

( * ) Notice: Subject to any disclaimer, the term of this patent is extended or adjusted under 35 U.S.C. 154(b) by 81 days.

(21) Appl. No.: 14/852,007

(22) Filed: Sep. 11, 2015

(65) Prior Publication Data
US 2017/0071152 A1    Mar. 16, 2017

(51) Int. Cl.
*A01K 1/10* (2006.01)
*A01K 5/01* (2006.01)
*A01K 7/00* (2006.01)

(52) U.S. Cl.
CPC . *A01K 5/01* (2013.01); *A01K 7/00* (2013.01)

(58) Field of Classification Search
CPC ...... A01K 7/00; A01K 5/0114; A01K 5/0128; A01K 5/00; A45F 3/46
USPC ........ 119/51.5, 51.01, 61.5, 61.56; 220/4.24; 206/546, 547
See application file for complete search history.

(56) References Cited

U.S. PATENT DOCUMENTS

| | | |
|---|---|---|
| 4,257,353 A | 3/1981 | Imhoff |
| 5,636,594 A | 6/1997 | Pina |
| 5,660,117 A | 8/1997 | Noble |
| 5,752,464 A * | 5/1998 | King ............... A01K 5/0114 119/51.5 |
| 5,823,136 A | 10/1998 | Zarski |
| 6,443,096 B1 * | 9/2002 | Prydie ............. A01K 5/0114 119/61.56 |
| 6,516,745 B1 | 2/2003 | Spires et al. |
| 7,207,290 B2 | 4/2007 | Nichols |
| 7,263,949 B1 * | 9/2007 | Seaford ........... A01K 5/0114 119/51.5 |
| D571,614 S | 6/2008 | Curtin |
| D577,466 S | 9/2008 | Shamoon |
| D582,101 S | 12/2008 | Shamoon |
| D584,110 S | 1/2009 | Hauser |
| D597,262 S | 7/2009 | Shamoon et al. |
| D611,769 S | 3/2010 | Hauser |
| D618,862 S | 6/2010 | Shamoon et al. |
| D645,705 S | 9/2011 | Shamoon |
| D665,541 S | 8/2012 | Shamoon |
| 8,490,551 B1 | 7/2013 | Wagner et al. |
| 8,607,375 B2 | 12/2013 | Yeung |
| D773,126 S | 11/2016 | Scaba |
| 9,545,176 B1 | 1/2017 | Finell et al. |
| 2002/0083900 A1 * | 7/2002 | Williams ......... A01K 5/0114 119/51.01 |
| 2006/0130769 A1 | 6/2006 | Nichols |
| 2007/0251874 A1 | 11/2007 | Stewart |
| 2009/0199775 A1 | 8/2009 | Shamoon |

(Continued)

*Primary Examiner* — Kristin C Hayes
(74) *Attorney, Agent, or Firm* — Standley Law Group LLP (57) ABSTRACT

The present invention is directed to a portable feeding apparatus or bowl, more particularly to a travel feeding apparatus for pets having hinged, collapsible bowls for holding food and water.

24 Claims, 7 Drawing Sheets

(56) References Cited

U.S. PATENT DOCUMENTS

| | | | |
|---|---|---|---|
| 2009/0235458 A1* | 9/2009 | Yarmer | A47G 23/06 |
| | | | 5/639 |
| 2010/0140279 A1 | 6/2010 | Tyson et al. | |
| 2014/0261203 A1 | 9/2014 | Renforth et al. | |
| 2016/0249584 A1* | 9/2016 | Yibao | A01K 7/00 |

* cited by examiner

TRAVELING FEEDING APPARATUS

BACKGROUND OF THE INVENTIVE FIELD

The present invention is directed to a portable feeding apparatus or bowl, more particularly to a travel feeding apparatus having hinged, collapsible bowls for food and water.

Although collapsible feeding bowls are known in the art, the present invention is novel in that it provides a unique combination of features that provides a portable dual-bowl feeding/drinking apparatus while also allowing for the storage and transport of food and/or water or other liquids. The present invention provides for a highly flexible, compactable and convenient apparatus for storing food/liquid, carrying food/liquid, and feeding not previously known in the art.

SUMMARY OF THE GENERAL INVENTIVE CONCEPT

The present invention relates to a portable, traveling feeding apparatus, preferably comprised of a first collapsible bowl, the first collapsible bowl supported by a frame portion having a handle, hinged to a second collapsible bowl, the second collapsible bowl supported by a frame portion having a handle. The portable bowl of the present invention preferably has a lock portion for locking the first and second bowls in the closed position.

The portable, traveling feeding apparatus of the present invention preferably has two bowl portions, one bowl for holding food, the other bowl for holding water. In the preferred embodiment of the invention, the first and second bowl portions are collapsible from a closed to expanded position when in use. The bowls can be placed in the collapsed position for traveling or storage as the bowls take up less space when in the collapsed position. With the hinge in the closed position and the bowls in the collapsed position (e.g., traveling state), the portable feeding apparatus of the present invention can be stored in a fairly small space, e.g., in cupboard, drawer, or traveling bag.

The foregoing and other features and advantages of the present invention will be apparent from the following more detailed description of the particular embodiments, as illustrated in the accompanying drawings.

BRIEF DESCRIPTION OF THE DRAWINGS

The following detailed description of the example embodiments refers to the accompanying figures that form a part thereof. The detailed description provides explanations by way of exemplary embodiments. It is to be understood that other embodiments may be used having mechanical and electrical changes that incorporate the scope of the present invention without departing from the spirit of the invention.

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
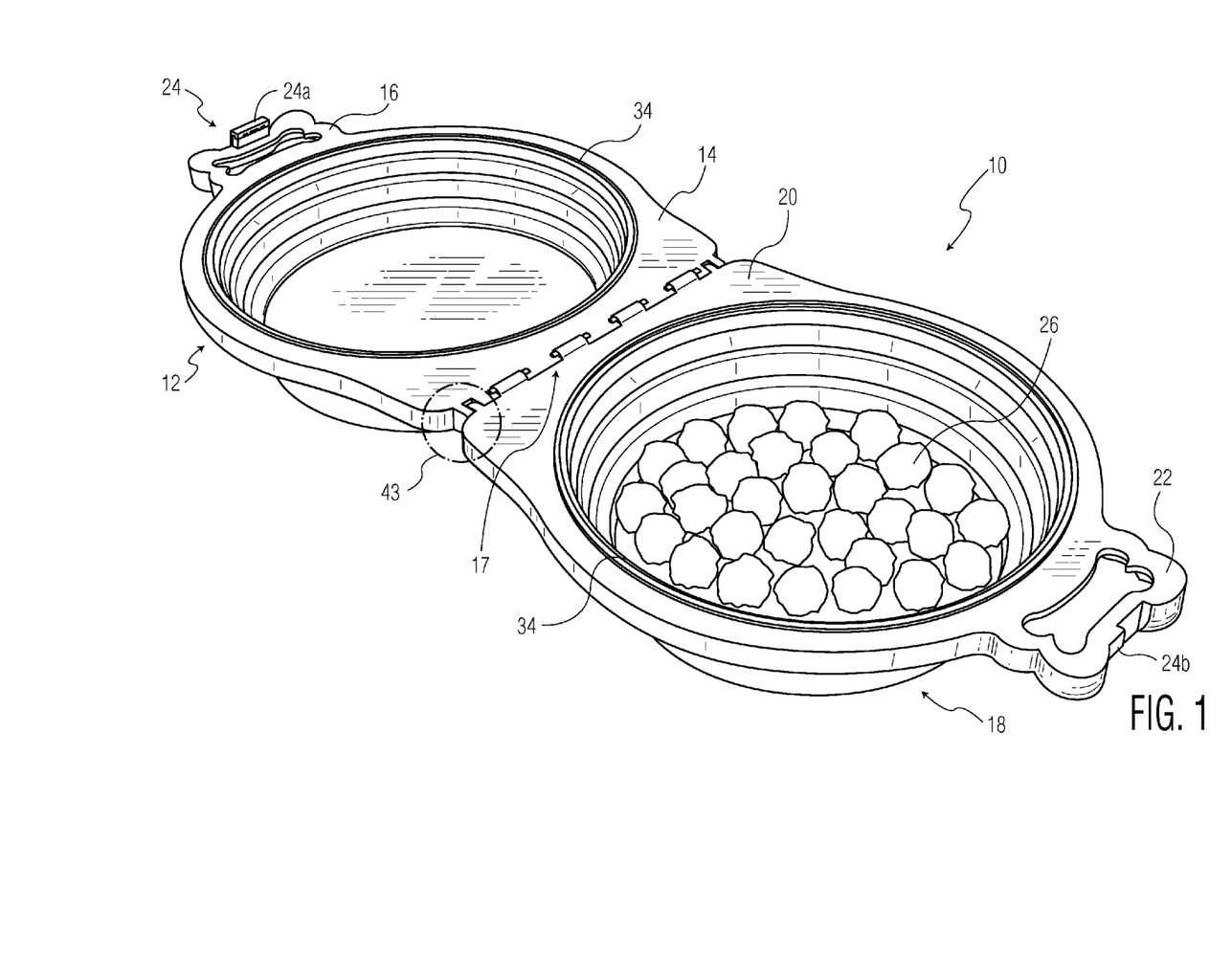
FIG. 1 illustrates one embodiment of the portable feeding apparatus of the present invention.

FIG. 1 illustrates one embodiment of the portable feeding apparatus 10 of the present invention. The present invention relates to a portable, traveling feeding apparatus, preferably comprised of a first collapsible bowl 12, the first collapsible bowl supported by a frame portion 14 and a handle 16, hinged 17 to a second collapsible bowl 18, the second collapsible bowl supported by a frame portion 20 and a handle 22. The portable apparatus of the present invention preferably has a lock or fastener portion 24 for holding the first and second bowls in the closed position. Reference numeral 43 refers to the dotted circle portion that is blown up as FIG. 7.

The portable feeding apparatus of the present invention preferably has two bowl portions: one bowl for holding food, the other bowl for holding water. In the preferred embodiment, of the invention, the first and second bowl portions can be moved from a closed position to an expanded position when in use. FIG. 1 shows the bowls in open-hinged position with the bowls expanded ready for use. Food, shown generally at 26, can be placed in one of the bowls and water can be placed in the other bowl.

In the preferred embodiment, the diameter of the bowls are the same size so that the openings of the bowls mate with each other when the apparatus is in the closed position. Thus, when in the closed position, the rims and/or frames of each of the bowls are disposed against each other thus forming a seal to lock in the contents of the bowl in the apparatus. For example, see FIGS. 2 and 3 showing the frames/rims disposed against each other when the apparatus is in the closed position so that any contents in the bowl portions are sealed in the apparatus.

Figure 2:
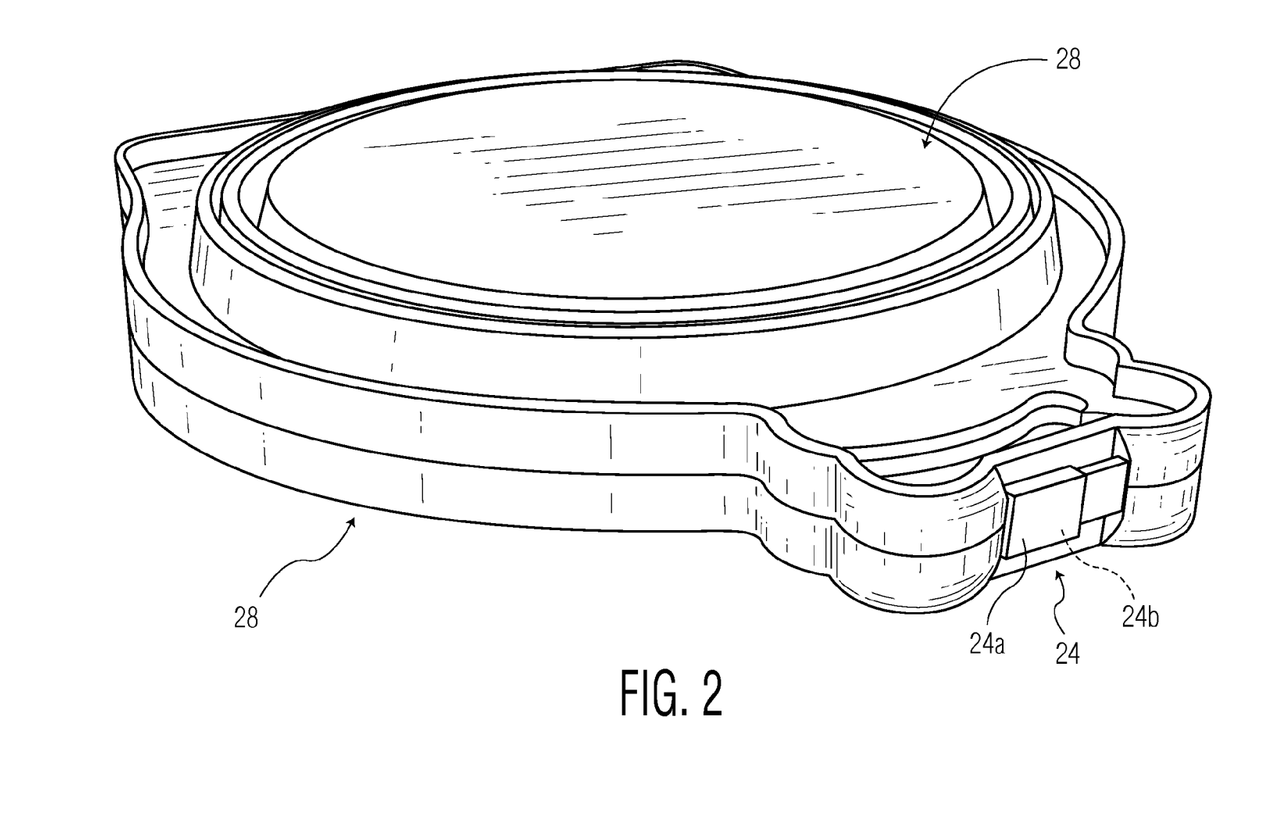
FIG. 2 illustrates the feeding apparatus of FIG. 1 in the closed and collapsed position and having a slide lock.

FIG. 2 illustrates the feeding apparatus of FIG. 1 in the closed and collapsed position and having a slide lock 24a, 24b. In this figure, both bowls are placed in the collapsed position (shown generally at 28) for traveling or storage as the bowls take up less space when in the collapsed position. As illustrated, the first and second collapsible bowls have openings that are disposed next to each other when the apparatus is in the closed position. With the hinge in the closed position and the bowls in the collapsed position (e.g., storage state), the portable feeding apparatus of the present invention can be stored in a fairly small space, e.g., in a cupboard, drawer, or traveling bag.

In this embodiment, the handle is comprised of two half portions 16, 22—each half attached to one of the bowl portions respectively. When the feeding apparatus is closed, both halves of the handle come together to form the complete handle. The slide lock is comprised of a slide portion 24a on one of the halves of the handle that the user can slide over a matching protrusion piece 24b on the other half of the handle to lock the apparatus in the closed position.

Figure 3:
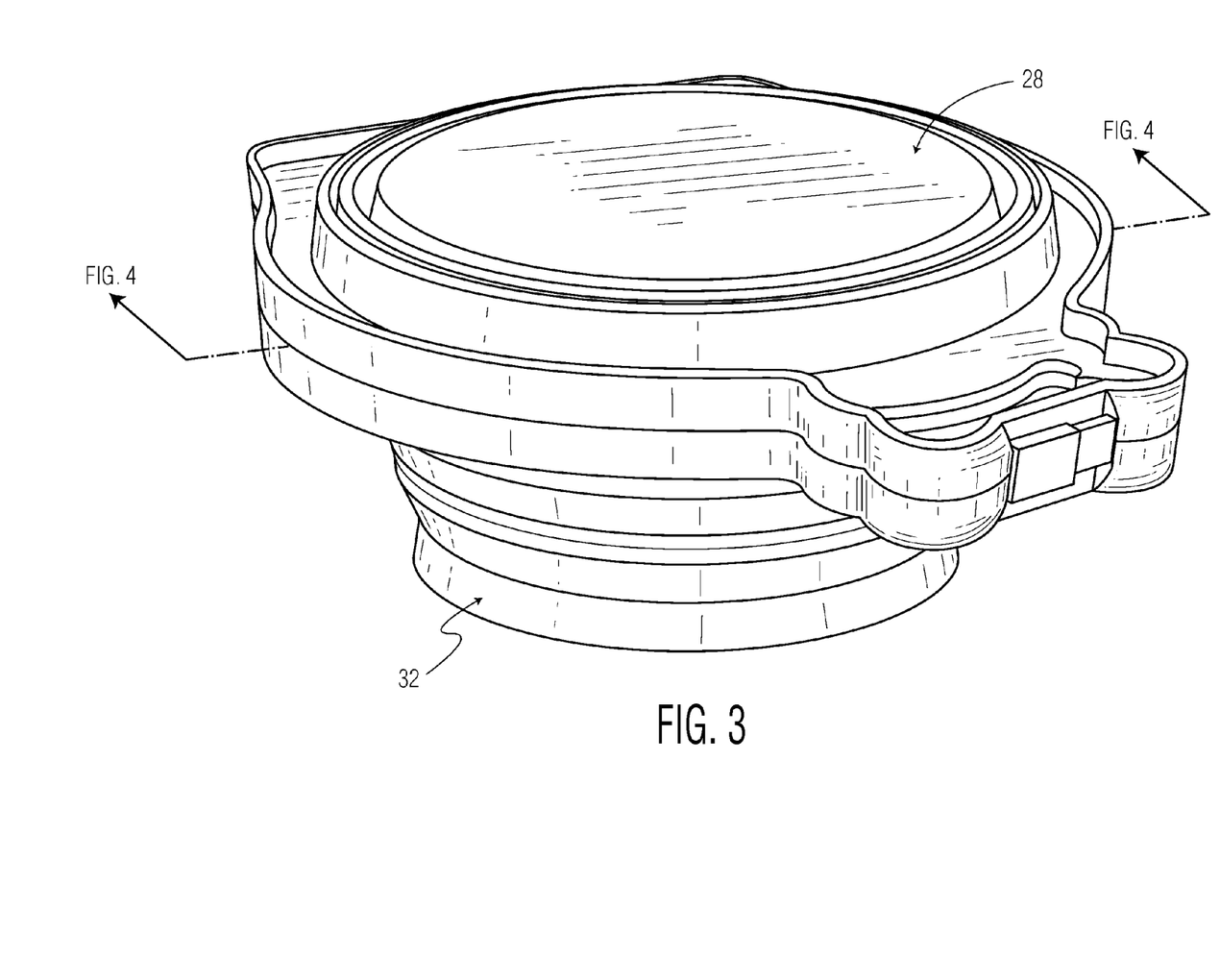
FIG. 3 illustrates the feeding apparatus of FIG. 1 in the closed position where one of the bowls is in the collapsed position and the other bowl is in the expanded position.

FIG. 3 illustrates the feeding apparatus of FIG. 1 in the closed position where one of the bowls is in the collapsed position and the other bowl is in the expanded position. In this closed position, the lock can be positioned to hold the feeding apparatus in the closed position. In this closed position, with one of the bowls in the expanded position (shown generally at 32), food can be stored in the apparatus. For example, pet food can be stored in the expanded bowl for traveling purposes. When the user is ready to feed the pet (for example at a rest stop at a highway), the user can then open the feeding apparatus, expand the other bowl and place water in it. In this way, the feeding apparatus of the present invention can be used as a food storage and carrying device.

Figure 4:
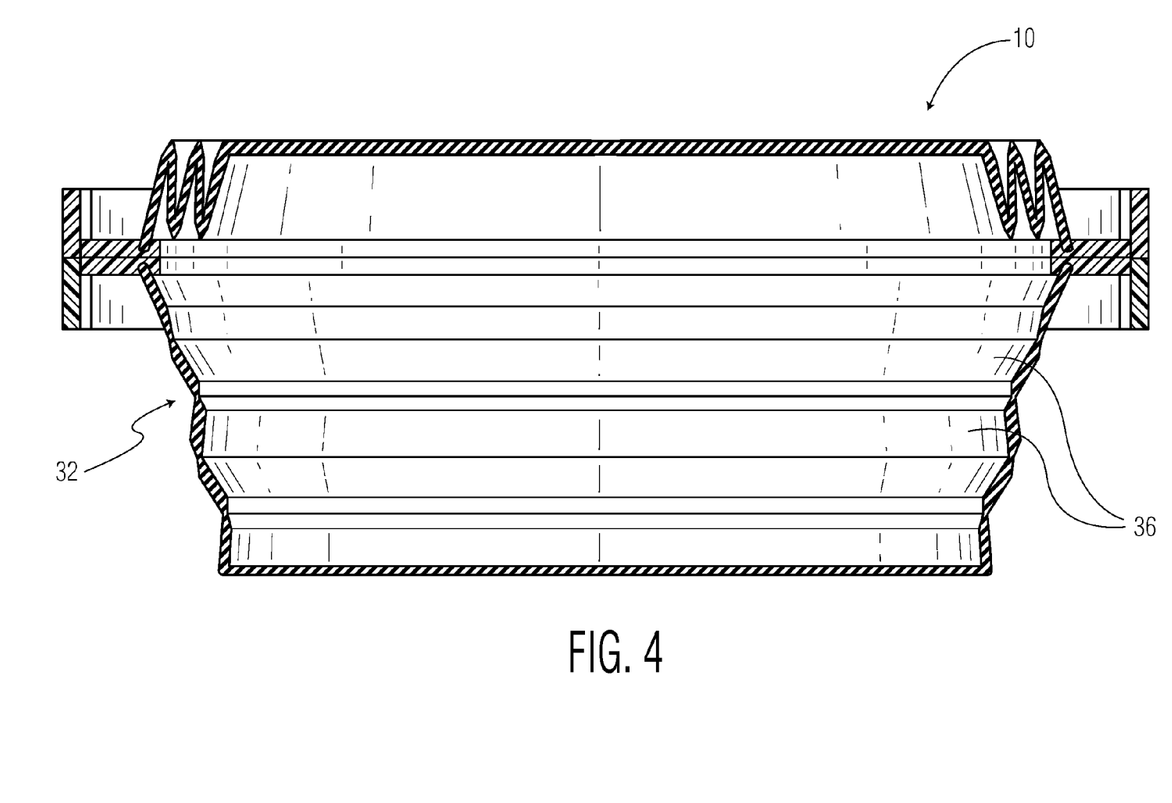
FIG. 4 illustrates a cross-section view of the bowl of FIG. 3.

FIG. 4 illustrates a cross-section view of the bowl of FIG. 3. It is appreciated that one of ordinary skill in the art would understand how to configure the bowls to provide the ability to collapse or expand the bowl. For example, as illustrated, in this embodiment the bowls are comprised of flexible, plastic or elastomeric membranes 36 that permit the collapsing or "squishing" of the bowls. As illustrated, the bowls are comprised of stacked layers of these annular shaped rings that have diameters that decrease in size allowing the bowls to be collapsed and expanded as needed.

Figure 5:
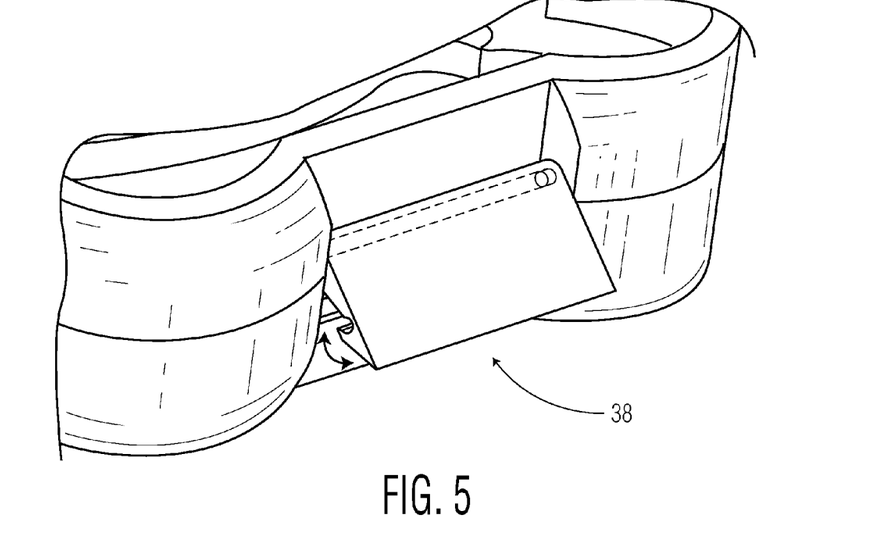
FIG. 5 illustrates one embodiment of hinged lock.
Figure 6:
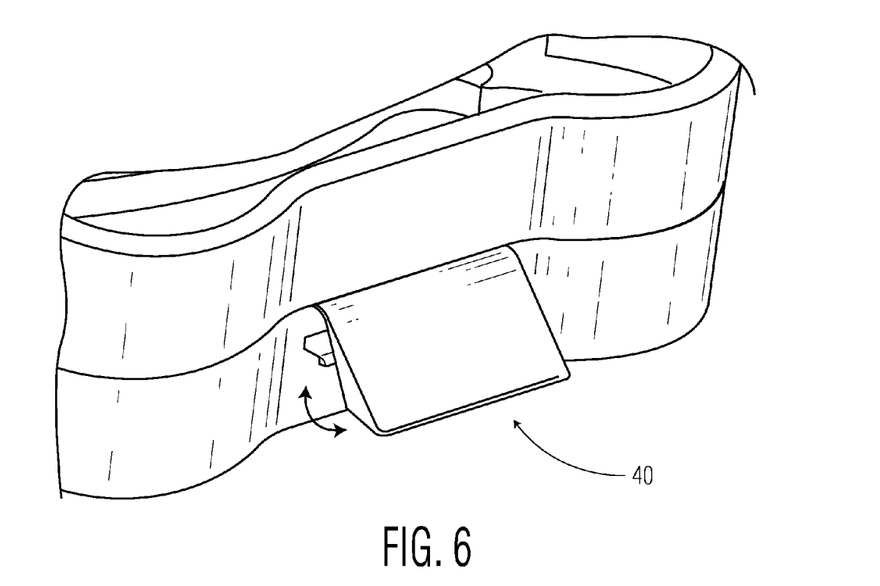
FIG. 6 illustrates one embodiment of molded lock.

Once the portable feeding apparatus of the present invention is closed, the lock portion can be locked to keep it in the closed position. FIG. 5 illustrates one alternate embodiment showing a hinged lock 38. FIG. 6 illustrates another alternate embodiment showing a molded lock 40. "Fastener" or "lock" as used herein means the ability to keep the apparatus in the closed position (e.g., the bowls are held shut) until it is undone and should not be so narrowly construed to be limited to a "key-type" lock.

Figure 7:
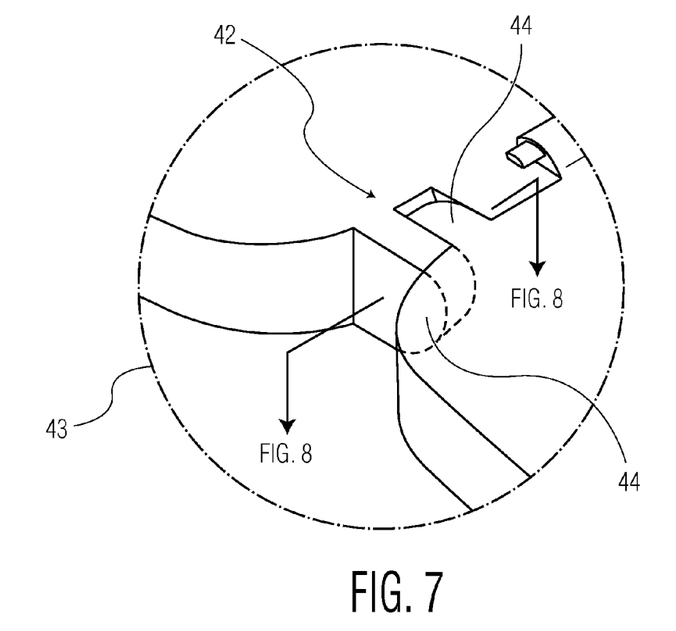
FIG. 7 illustrates a close-up view of the stop mechanism.
Figure 8:
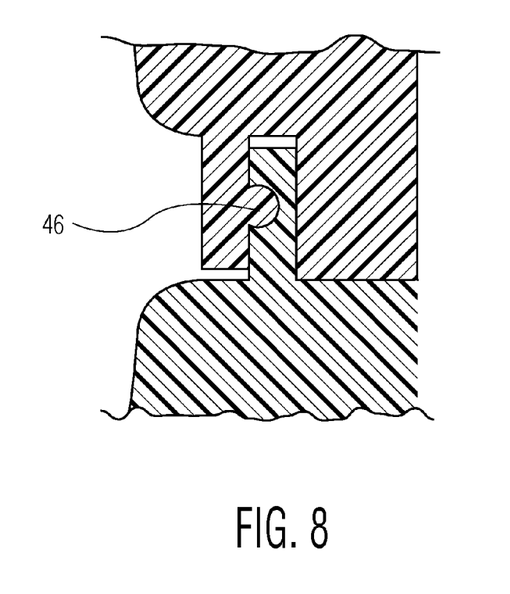
FIG. 8 illustrates a cross-section view of the stop mechanism of FIG. 7.

FIG. 7 illustrates a close-up view of one embodiment of the stop mechanism 42 of the present invention. FIG. 8 illustrates a cross-section view of the stop mechanism of FIG. 7. In this embodiment, this stop mechanism is comprised of interlocking members 44 of the frame portions of the first and second bowl portions, respectively. One of the interlocking members of the stop mechanism has a small bump, protrusion or member 46 (e.g., in a rounded "ball" shape) with a matching socket molded for accepting a ball, bump or protrusion member. In the preferred embodiment, there are two stop mechanisms, placed just outside to the right and left of the hinge portions. These stop mechanisms create a "click" and locking effect so that when portable feeding apparatus is opened for use, the bump will "click" into the socket and the apparatus will be held in the open position and will resist the hinges natural instinct to fold. To close the portable bowl, a user would grab both halves (i.e., first and second bowl sections) and apply a slight pressure to get the ball to release from the socket on either side in order to fold the portable bowl back up to the closed position.

Figure 9:
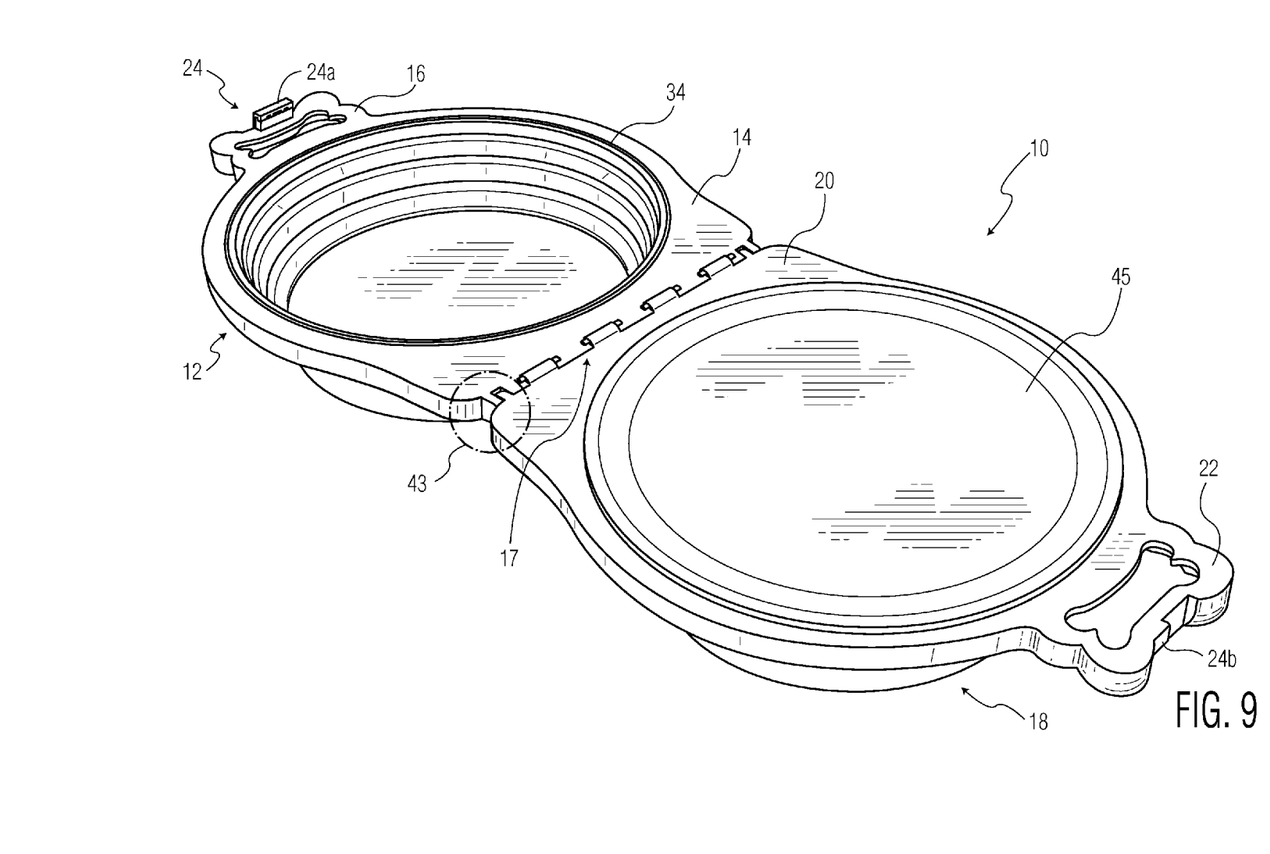
FIG. 9 illustrates the feeding apparatus of FIG. 1 with a lid over one bowl portion.

In an alternate embodiment, lids can be provided for one or both bowls to keep food or water stored in the bowls from spilling out. In this embodiment, water and food can be stored and carried in the portable feeding apparatus of the present invention. In one embodiment, the lids are plastic and can be securely held in place by each of the rims 34 of the bowls, respectively. FIG. 9 illustrates the feeding apparatus of FIG. 1 with a lid 45 over one bowl portion.

While certain embodiments of the present invention are described in detail above, the scope of the invention is not to be considered limited by such disclosure, and modifications are possible without departing from the spirit of the invention as evidenced by the following claims:

What is claimed is:
1. A portable feeding apparatus, comprising:
a first collapsible bowl;
a second collapsible bowl;
a hinge for hingably connecting the first and second collapsible bowls together;
a fastener for holding the first and second collapsible bowls to each other when the feeding apparatus is in a closed position;
a handle operationally connected to at least one bowl for carrying the apparatus;
a stop mechanism for holding the apparatus in a predetermined open position for use;
a first lid for covering the first collapsible bowl;
wherein the first and second collapsible bowls are adapted to be expanded to hold food or water and collapsed to conserve space; and
wherein the feeding apparatus is adapted to be opened for feeding use and closed when not in use.

2. A portable feeding apparatus according to claim 1, where the handle is directly connected to one of the bowls.

3. A portable feeding apparatus according to claim 1, further comprising:
a first frame portion connected to the first collapsible bowl;
a second frame portion connected to the second collapsible bowl; and
wherein the hinge is operationally connected to the first and second frame portions.

4. A portable feeding apparatus according to claim 1, wherein the first collapsible bowl is comprised of a rim for accepting a lid.

5. A portable feeding apparatus according to claim 1, wherein the fastener is a sliding fastener.

6. A portable feeding apparatus according to claim 1, wherein fastener is a molded fastener.

7. A portable feeding apparatus according to claim 1, wherein the apparatus is adapted so that one of the bowls can be expanded while the other bowl is collapsed; and
wherein food or water can be stored in the apparatus with the apparatus closed and locked.

8. A portable feeding apparatus according to claim 1, wherein the stop mechanism is comprised of a first and second interlocking member, the first interlocking member having a protruding member, the second interlocking member having a socket for accepting the protruding member, and wherein the apparatus is held in a predetermined open position when the protruding member is disposed in the socket.

9. A portable feeding apparatus according to claim 1, further comprising:
a second lid for covering the second collapsible bowl.

10. A portable feeding apparatus according to claim 1, wherein the first and second collapsible bowls have openings and wherein the openings of the first and second collapsible bowls are disposed next to each other when the apparatus is in the closed position.

11. A portable feeding apparatus according to claim 1, wherein the feeding apparatus is adapted to store food or water when the apparatus is closed and wherein one of the bowls is in the expanded position.

12. A portable feeding apparatus according to claim 1, wherein the diameter of the first and second bowls are the same size so that the openings of the bowls mate with each other when the apparatus is in the closed position; and
when the apparatus is in the closed position, the frames or rims of each of the bowls are disposed against each other thus forming a seal to lock in contents of the apparatus.

13. A portable feeding apparatus, comprising:
a first collapsible bowl;

a second collapsible bowl;
a hinge for hingably connecting the first and second collapsible bowls together;
a fastener for holding the first and second collapsible bowls to each other when the feeding apparatus is in a closed position;
a handle operationally connected to at least one bowl for carrying the apparatus;
wherein the first and second collapsible bowls have openings and wherein the openings of the first and second collapsible bowls are disposed next to each other when the apparatus is in the closed position;
a first lid for covering the first collapsible bowl;
wherein the handle is directly connected to one of the bowls;
wherein the first and second collapsible bowls are adapted to be expanded to hold food or water and collapsed to conserve space; and
wherein the feeding apparatus is adapted to be opened for feeding use and closed when not in use.

14. A portable feeding apparatus according to claim 13, further comprising:
a first frame portion connected to the first collapsible bowl;
a second frame portion connected to the second collapsible bowl; and
wherein the hinge is operationally connected to the first and second frame portions.

15. A portable feeding apparatus according to claim 13, further comprising:
a second lid for covering the second collapsible bowl.

16. A portable feeding apparatus according to claim 13, wherein the handle is comprised of an opening in the shape of a dog bone for placement of fingers for carrying the feeding apparatus.

17. A portable feeding apparatus according to claim 13, wherein the diameter of the first and second bowls are the same size so that the openings of the bowls mate with each other when the apparatus is in the closed position; and
when the apparatus is in the closed position, the frames or rims of each of the bowls are disposed against each other thus forming a seal to lock in contents of the apparatus.

18. A portable, travel feeding apparatus, comprising:
a first collapsible bowl;
a second collapsible bowl;
a hinge for hingably connecting the first and second collapsible bowls together;
a fastener for holding the first and second collapsible bowls to each other when the feeding apparatus is in a closed position;
a handle operationally connected to at least one bowl for carrying the apparatus;
a first lid for covering the first collapsible bowl;
wherein the first and second collapsible bowls have openings and wherein the openings of the first and second collapsible bowls are disposed next to each other when the apparatus is in the closed position;
wherein the handle is directly connected to one of the bowls;
wherein the first and second collapsible bowls are adapted to be expanded to hold food or water and collapsed to conserve space; and
wherein the feeding apparatus is adapted to be opened for use in feeding and closed for storage or traveling.

19. A portable feeding apparatus according to claim 18, further comprising:
a first frame portion connected to the first collapsible bowl;
a second frame portion connected to the second collapsible bowl; and
wherein the hinge is operationally connected to the first and second frame portions.

20. A portable feeding apparatus according to claim 18, wherein the handle is comprised of an opening in the shape of a dog bone for placement of fingers for carrying the feeding apparatus.

21. A portable feeding apparatus according to claim 20, further comprising:
a stop portion for holding the apparatus in a predetermined open position for use.

22. A portable feeding apparatus according to claim 21, wherein the stop portion is comprised of a first and second interlocking member, the first interlocking member having a protruding member, the second interlocking member having a socket for accepting the protruding member, and wherein the apparatus is held in a predetermined open position when the protruding member is disposed in the socket.

23. A portable feeding apparatus according to claim 18, wherein the diameter of the first and second bowls are the same size so that the openings of the bowls mate with each other when the apparatus is in the closed position; and
when the apparatus is in the closed position, the frames or rims of each of the bowls are disposed against each other thus forming a seal to lock in contents of the apparatus.

24. A portable feeding apparatus, comprising:
a first collapsible bowl having a rim;
a second collapsible bowl having a rim;
a first frame portion surrounding the rim of the first collapsible bowl, the first frame portion connected to the first collapsible bowl;
a second frame portion surrounding the rim of the second collapsible bowl, the second frame portion connected to the second collapsible bowl;
a hinge operationally connected to the first and second frame portions for hingably connecting the first and second collapsible bowls together;
a first lid for covering the first collapsible bowl;
when the apparatus is in the closed position, the first and second frames are disposed against each other thus forming a seal to lock in contents of the apparatus;
wherein the first and second collapsible bowls are adapted to be expanded to hold food or water and collapsed to conserve space; and
wherein the feeding apparatus is adapted to be opened for feeding use and closed when not in use.

* * * * *